(12) United States Patent
Kwon et al.

(10) Patent No.: US 9,375,996 B2
(45) Date of Patent: Jun. 28, 2016

(54) DEVICE AND METHOD FOR CONTROLLING COMPRESSOR OF VEHICLES BASED ON ACCELERATION CONDITION OF VEHICLE

(75) Inventors: Choon Gyu Kwon, Hwaseong-si (KR); Jae Woong Kim, Hwaseong-si (KR); Chang Won Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 1492 days.

(21) Appl. No.: 12/952,907

(22) Filed: Nov. 23, 2010

(65) Prior Publication Data

US 2012/0000211 A1 Jan. 5, 2012

(30) Foreign Application Priority Data

Jun. 30, 2010 (KR) .................. 10-2010-0063133

(51) Int. Cl.
*F25B 1/00* (2006.01)
*F25B 49/00* (2006.01)
*B60H 1/32* (2006.01)
*B60H 1/00* (2006.01)
*F04B 35/00* (2006.01)

(52) U.S. Cl.
CPC .......... *B60H 1/3208* (2013.01); *B60H 1/00764* (2013.01); *B60H 2001/3263* (2013.01); *B60H 2001/3266* (2013.01); *B60H 2001/3273* (2013.01); *F04B 35/002* (2013.01)

(58) Field of Classification Search
CPC .......... B60H 1/00764; B60H 1/00878; B60H 1/3208; B60H 2001/3266; B60H 2001/327; F04B 35/002; F04B 49/065; F04B 2203/0604; F04B 2203/0605; F04B 2203/0607; F04B 2205/10; F04B 2207/03
USPC ............. 62/133, 215, 226, 227, 228.1, 228.4, 62/230, 241
See application file for complete search history.

(56) References Cited

U.S. PATENT DOCUMENTS 4,498,311 A * 2/1985 Sakano et al. .................. 62/227
5,018,362 A * 5/1991 Nagase et al. .................. 62/133

(Continued)

FOREIGN PATENT DOCUMENTS

CN 1771142 A 5/2006
CN 1945146 A 4/2007

(Continued)

*Primary Examiner* — Marc Norman
*Assistant Examiner* — Paolo Gonzalez
(74) *Attorney, Agent, or Firm* — Morgan, Lewis & Bockius LLP

(57) ABSTRACT

A device and a method for a controlling compressor of vehicles may include a cabin temperature sensor, an outdoor temperature sensor, an evaporator temperature sensor, an engine speed sensor, and a throttle position sensor detecting a throttle opening, a condenser, an evaporator, a temperature control door controlling a temperature of an air flowed in a cabin, an intake door selectively flowing an inner air or an outer air in the cabin, and a blower blowing the air to the intake door, and a controller controlling an operation of the air conditioning system, wherein the controller decides a acceleration mode and an allowable temperature at each acceleration mode when an acceleration condition occurs, and decreases an operation of the compressor according to a difference between the evaporator temperature and the allowable temperature.

8 Claims, 7 Drawing Sheets

(56) References Cited

U.S. PATENT DOCUMENTS

| | | | |
|---|---|---|---|
| 5,117,643 A * | 6/1992 | Sakurai et al. | 62/133 |
| 6,330,909 B1 * | 12/2001 | Takahashi et al. | 165/202 |
| 6,463,749 B2 * | 10/2002 | Niimi | 62/228.1 |
| 6,688,120 B2 * | 2/2004 | Aoki et al. | 62/133 |
| 6,691,522 B1 * | 2/2004 | Kojima | 62/133 |
| 6,715,303 B2 * | 4/2004 | Masuda et al. | 62/133 |
| 6,854,513 B2 * | 2/2005 | Shirota et al. | 165/203 |
| 7,100,383 B2 * | 9/2006 | Sugesawa et al. | 62/133 |
| 7,826,961 B2 * | 11/2010 | Jinno | 701/112 |

FOREIGN PATENT DOCUMENTS

| | | |
|---|---|---|
| CN | 1966291 A | 5/2007 |
| CN | 101684791 A | 3/2010 |
| JP | 2007-504044 A | 3/2007 |
| JP | 2008-62790 A | 3/2008 |
| JP | 2009-107419 A | 5/2009 |
| KR | 10-0805478 B1 | 2/2008 |
| KR | 10-2009-0071192 A | 7/2009 |
| KR | 10-2009-0130914 A | 12/2009 |
| KR | 10-2009-0131928 A | 12/2009 |

* cited by examiner

DEVICE AND METHOD FOR CONTROLLING COMPRESSOR OF VEHICLES BASED ON ACCELERATION CONDITION OF VEHICLE

CROSS-REFERENCE TO RELATED APPLICATION

This application claims priority to and the benefit of Korean Patent Application No. 10-2010-0063133 filed in the Korean Intellectual Property Office on Jun. 30, 2010, the entire contents of which application is incorporated herein for all purposes by this reference.

BACKGROUND OF THE INVENTION

1. Field of the Invention

The present invention relates to a device and a method for controlling a compressor of vehicles, and more particularly, to a device and a method for a controlling compressor of vehicles which improves acceleration performance and fuel efficiency and maintains comfort of a cabin by decreasing an operation of the compressor when accelerating.

2. Description of the Related Art

Recently, countries tighten exhaust regulations and fuel efficiency regulations so as to retard progress of global warming and to prepare depletion of petroleum resources. In order to enhance fuel efficiency, improvement of auxiliary machinery including a powertrain is required. An air conditioning system including an air conditioner is one of such auxiliary machinery.

Such air conditioning systems include a compressor. The compressor selectively receives an engine torque transmitted through a pulley by engaging or disengaging operation of an electric clutch and compresses a cooling medium flowing in from an evaporator. After that, the compressor flows the cooling medium out to a condenser. Various types of compressors exist, and compressors of variable-capacity type are widely used for vehicles.

According to the compressor of variable-capacity type, a pressure control valve changes pressure of the cooling medium based on a load, and thereby, an angle of an inclined plate can be controlled. If the angle of the inclined plate is changed, stroke of a piston changes, and accordingly, discharge flux of the cooling medium can also be controlled.

A great amount of driving torque is required for operating the compressor. Particularly, since the compressor receives the driving torque by the pulley connected to a crankshaft of an engine through a belt, the compressor is operated according to an engine speed irrelevant to a target cooling performance. In addition, since occupants operate the air conditioning system for their comfort, the compressor may operate excessively and fuel efficiency may be deteriorated. These problems mainly occur when acceleration or deceleration.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a device and a method for controlling a compressor of vehicles having advantages of improving acceleration performance and fuel efficiency and maintaining comfort of a cabin by decreasing an operation of the compressor when accelerating.

Various aspects of the present invention are directed to a device for controlling a compressor of vehicles that may include a sensor module including a cabin temperature sensor detecting a cabin temperature of the vehicle, an outdoor temperature sensor detecting an outdoor temperature of the vehicle, an evaporator temperature sensor detecting a temperature of a cooling medium in an evaporator (evaporator temperature), an engine speed sensor detecting rotation speed of an engine, and a throttle position sensor detecting a throttle opening, an air conditioning system including a condenser condensing and liquefying the cooling medium, an evaporator evaporating the liquefied cooling medium, the compressor compressing the cooling medium, a temperature control door controlling a temperature of an air flowed in a cabin of the vehicle, an intake door selectively flowing an inner air or an outer air in the cabin of the vehicle, and a blower blowing the air to the intake door, and a controller controlling an operation of the air conditioning system, wherein the controller decides a acceleration mode and an allowable temperature at each acceleration mode when an acceleration condition occurs, and decreases an operation of the compressor according to a difference between the evaporator temperature and the allowable temperature.

The allowable temperature at each acceleration mode may be decided according to the outdoor temperature of the vehicle.

The temperature control door may be controlled to lower the temperature of the air supplied to the cabin when the evaporator temperature is higher than a target temperature during decreasing the operation of the compressor.

Control of the temperature control door by the controller may include control of the intake door through which the inner air or the outer air selectively flows in the cabin and control of blowing speed of the blower.

The controller may increase the operation of the compressor according to a target increasing rate of the operation of the compressor when a release condition occurs during decreasing the operation of the compressor or a time spent decreasing the operation of the compressor is larger than or equal to a maximum time.

The controller may increase the operation of the compressor until the operation of the compressor reaches to a target operation of the compressor.

The controller may control the temperature control door to lower the temperature of the air supplied to the cabin when the evaporator temperature is higher than a second target temperature during increasing the operation of the compressor.

The control of the temperature control door by the controller may include the control of the intake door through which the inner air or the outer air selectively flows in the cabin and the control of blowing speed of the blower.

Various aspects of the present invention are directed to a method for controlling a compressor of vehicles that may include a) determining whether an acceleration condition occurs, b) determining whether an evaporator temperature is lower than an allowable temperature in a case that the acceleration condition occurs, c) decreasing the operation of the compressor based on a difference between the evaporator temperature and the allowable temperature when the evaporator temperature is lower than the allowable temperature, d) determining whether the evaporator temperature is higher than a target temperature while the operation of the compressor is decreased, and e) controlling the temperature control door, the intake door, and the blower so as to lower the temperature of the air supplied to the cabin when the evaporator temperature is higher than the target temperature.

The allowable temperature may be varied according to an acceleration mode decided based on a throttle opening and an engine speed, and the allowable temperature at each acceleration mode may be decided according to the outdoor temperature of the vehicle.

The intake door may be controlled based on a difference between the cabin temperature and the outdoor temperature or the outdoor temperature, and the blower may be controlled based on an inner air ratio at the step e).

The method for controlling the compressor of the vehicles may further include g) determining whether a release condition occurs or a time spent decreasing the operation of the compressor is larger than or equal to a maximum time, wherein the steps b) to e) are repeated when the release condition does not occur or the time spent decreasing the operation of the compressor is smaller than the maximum time at the step g).

In a case that the evaporator temperature is higher than or equal to the allowable temperature at the step b) or the release condition occurs or the time spent decreasing the operation of the compressor is larger than or equal to the maximum time at the step g), the method may further include h) increasing the operation of the compressor according to a target increasing rate of the operation of the compressor, i) determining whether the operation of the compressor is lower than a target operation of the compressor, j) determining whether the evaporator temperature is higher than the target temperature when the operation of the compressor is lower than the target operation of compressor, and k) controlling the temperature control door, the intake door, and the blower so as to lower the temperature of the air supplied to the cabin when the evaporator temperature is higher than the target temperature.

The steps h) to k) may be repeated when the evaporator temperature is lower than or equal to the target temperature at the step j) or the step k) is performed.

The intake door may be controlled based on the difference between the cabin temperature and the outdoor temperature or the outdoor temperature, and the blower may be controlled based on the inner air ratio at the step k).

Controlling the compressor may be finished when the operation of the compressor reaches the target operation of the compressor at the step i).

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
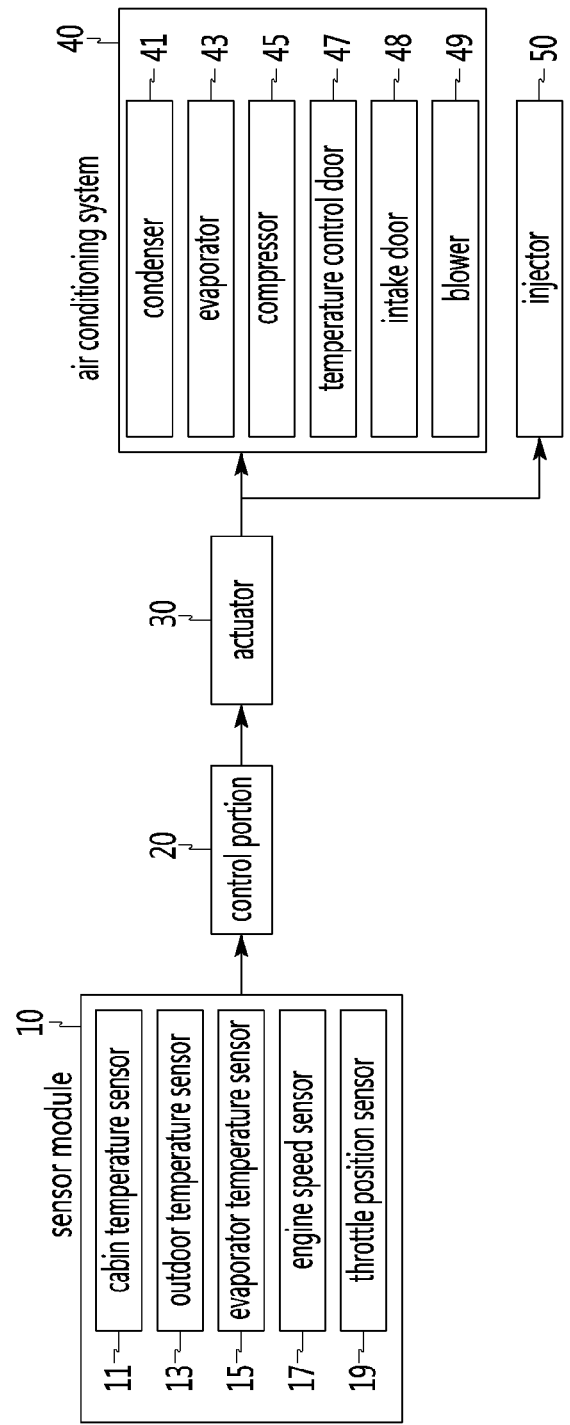
FIG. 1 is a block diagram of an exemplary device for controlling a compressor of vehicles according to the present invention.

As shown in FIG. 1, a device for controlling a compressor of vehicles according to various embodiments of the present invention includes a sensor module 10, a control portion 20, an actuator 30, an air conditioning system 40, and an injector 50.

The sensor module 10 includes a cabin temperature sensor 11, an outdoor temperature sensor 13, an evaporator temperature sensor 15, an engine speed sensor 17, and a throttle position sensor 19. Additionally, the sensor module 10 further includes sensors for shifting (e.g., a vehicle speed sensor, a brake sensor, and so on) and/or sensors for controlling an engine (e.g., an exhaust temperature sensor, an oxygen sensor, and so on).

The cabin temperature sensor 11 detects a cabin temperature of the vehicle and transmits a signal corresponding thereto to the control portion 20.

The outdoor temperature sensor 13 detects an outer temperature of the vehicle and transmits a signal corresponding thereto to the control portion 20.

The evaporator temperature sensor 15 detects a temperature of a cooling medium passing through an evaporator and transmits a signal corresponding thereto to the control portion 20.

The engine speed sensor 17 detects a rotation speed of an engine from a phase change of a crankshaft, and transmits a signal corresponding thereto to the control portion 20.

The throttle position sensor 19 detects a throttle opening according to an operation of an accelerator pedal, and transmits a signal corresponding thereto to the control portion 20.

The control portion 20 is electrically connected to the sensor module 10 so as to receive signals corresponding to values detected by the sensor module 10, and controls the injector 50 and the air conditioning system 40 based on the signals. Various control units such as a transmission control unit controlling a transmission of the vehicle, an engine control unit controlling the engine, and an air conditioning system control unit controlling the air conditioning system 40 may be used in the vehicle, and the control portion 20 in this specification includes all the control units used in the vehicle. Particularly, it is to be understood that the control portion 20 includes all the control portions suitable to perform a method for controlling a compressor according to various embodiments of the present invention.

The actuator 30 is electrically connected to the control portion 20 and operates the air conditioning system 40 and/or the injector 50 according to a control signal transmitted from the control portion 20. A solenoid device may be used as the actuator 30, and the control signal may be a duty signal applied to the solenoid device.

The air conditioning system 40 includes all the devices used for warming, ventilating, and cooling the cabin of the vehicle. Concretely, the air conditioning system 40 includes a condenser 41, an evaporator 43, a compressor 45, a temperature control door 47, an intake door 48, and a blower 49. The air conditioning system 40 may include various components which are not described in this specification.

The condenser 41 condenses and liquefies the cooling medium, the evaporator 43 evaporates the liquefied cooling medium, and the compressor 45 compresses the cooling medium.

In addition, the temperature control door 47 controls a temperature of an air supplied to the cabin of the vehicle by mixing a warm air with a cool air, the intake door 48 controls an inner air, an outer air or a mixture of the inner and outer airs to flow in the cabin of the vehicle, the blower 49 blows the air toward the intake door.

Such an air conditioning system 40 is well known to a person of an ordinary skill in the art, and a detailed description thereof will be omitted.

The injector 50 injects a fuel so as to drive the vehicle (particularly, the engine).

Figure 2:
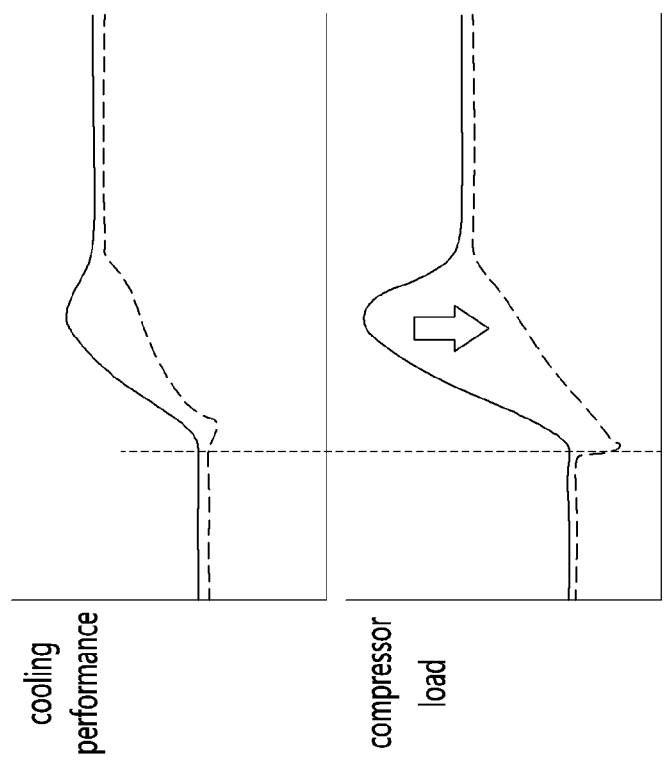
FIG. 2 is a graph explaining the spirit of the present invention.

A solid line in FIG. 2 represents a cooling performance and an operation (load) of the compressor according to a conventional art, and a dotted line represents a cooling performance and an operation (load) of the compressor according to various embodiments of the present invention.

If an acceleration condition of the vehicle occurs, the engine speed increases excessively and the compressor also operates excessively according to a conventional art. Therefore, a cooling performance and the operation (load) of the compressor increases excessively.

If the acceleration condition of the vehicle occurs, the operation (load) of the compressor is gradually increased to a target operation of the compressor after being decreased by a predetermined value according to the spirit of the present invention. Accordingly, the cooling performance is increased to a target cooling performance slowly after being decreased temporarily. Since an excessive operation of the compressor is prevented and power spent in operating the compressor is reduced if the acceleration condition of the vehicle occurs, acceleration performance and fuel efficiency may be improved.

A method for controlling a compressor for vehicles realizing the spirit of the present invention will be described with reference to FIG. 3 to FIG. 9.

Figure 3:
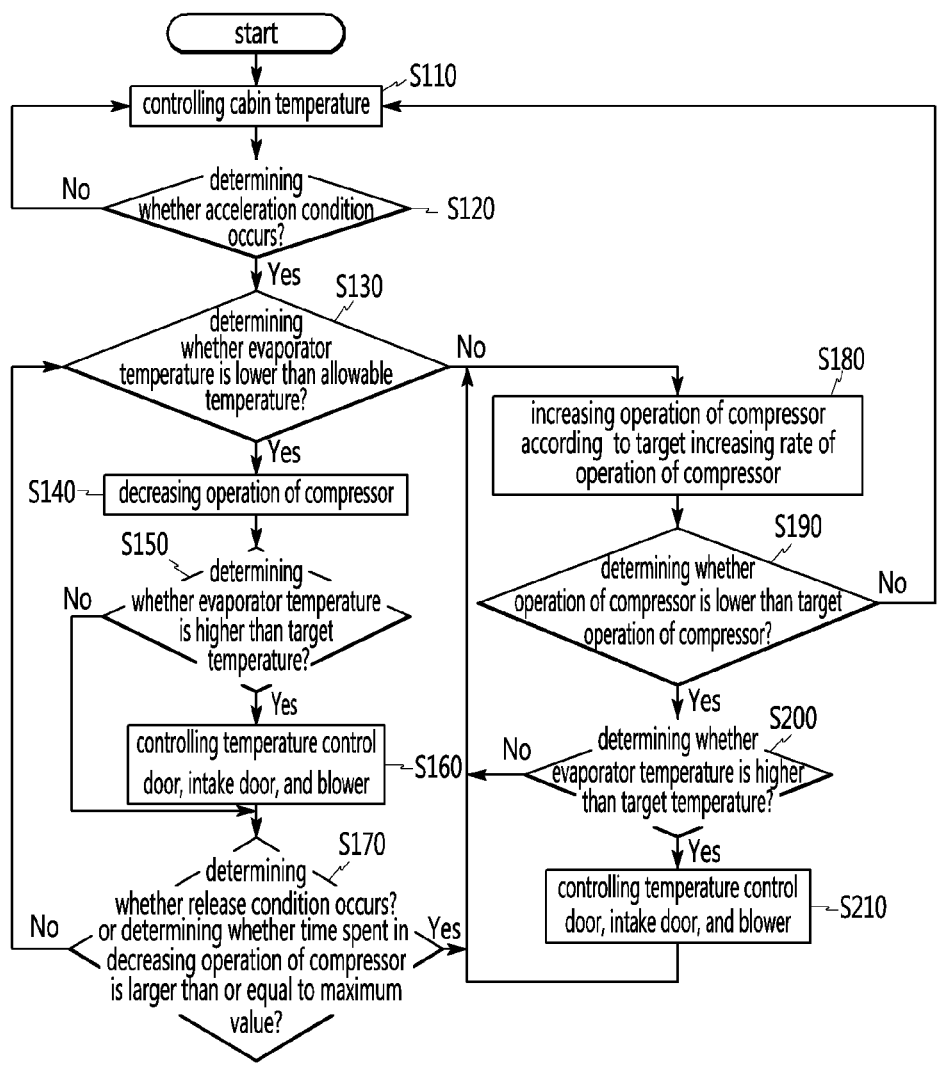
FIG. 3 is a flowchart of an exemplary method for controlling a compressor of vehicles according to the present invention.
Figure 4:
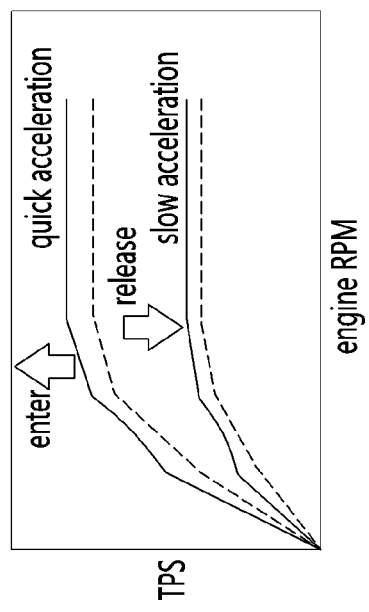
FIG. 4 is a map showing a condition of a throttle opening and an engine speed entering or releasing from each acceleration mode.

As shown in FIG. 3, in a state that the vehicle runs, the control portion 20 controls the cabin temperature of the vehicle at a step S110. At this state, the control portion 20 determines whether the acceleration condition occurs at a step S120. The acceleration condition (solid line) and the release condition (dotted line) at each acceleration mode are shown in FIG. 4. Such acceleration condition and release condition according to the engine speed and the throttle opening are defined in a map. According to various embodiments of the present invention, the control portion 20 determines the acceleration mode in a case that the acceleration condition is satisfied so as to improve accuracy of control of the compressor. Such acceleration mode includes a quick acceleration mode and a slow acceleration mode. The acceleration mode may further be subdivided, if necessary.

In addition, as shown in FIG. 4, an entry condition and a release condition are set differently at each acceleration mode. Frequent change of control states may be prevented by differently setting the entry condition and the release condition at each acceleration mode. That is, if the entry condition and the release condition are same at each acceleration mode, the control state may change frequently in a case that the engine is operated at a boundary of the acceleration condition. Thereby, fuel efficiency may be deteriorated. Therefore, the frequent change of the control state and deterioration of fuel efficiency may be prevented by differently setting the entry condition from the release condition at each acceleration mode.

The step S120 will further be described in detail. The control portion 20 determines whether a quick acceleration mode entry condition occurs or a slow acceleration mode entry condition occurs when the acceleration condition occurs. The reason why the acceleration modes are decided as described above is that an allowable temperature which is the basis of a decrease control of the operation of the compressor is differently set at each acceleration condition (referring to FIG. 5).

If the acceleration condition does not occur at the step S120, the control portion 20 continues to perform a cabin temperature control at the step S110.

Figure 5:
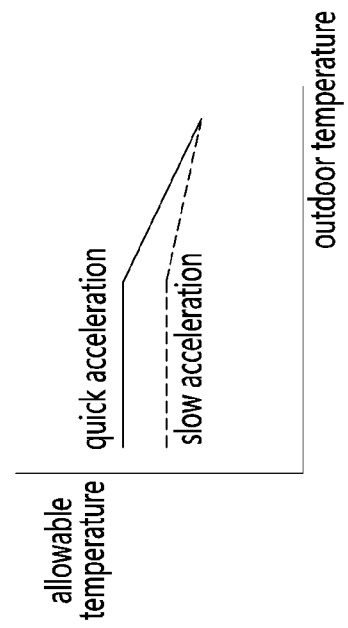
FIG. 5 is a graph showing an allowable temperature according to an outdoor temperature at each acceleration condition.

If the acceleration condition occurs at the step S120, the control portion 20 decides the acceleration mode and the allowable temperature at each acceleration mode as shown in FIG. 5.

The allowable temperature means an evaporator temperature corresponding to the temperature of the air required for maintaining the comfort of the cabin. If the operation of the compressor is decreased after the acceleration condition occurs, the temperature of the air supplied to the cabin increases. Therefore, the operation of the compressor should be increased again in order to lower the temperature of the air supplied to the cabin. This deteriorates fuel efficiency. In order to solve such problems, the operation of the compressor must be decreased until the evaporator temperature reaches the allowable temperature.

Such an allowable temperature at each acceleration mode is decided according to the outdoor temperature of the vehicle. If the outdoor temperature of the vehicle is low, the temperature of the air supplied to the cabin can be sufficiently lowered by controlling the temperature control door 47, the intake door 48, and the blower 49 without increasing the operation of the compressor even if the allowable temperature of the evaporator is high.

Meanwhile, the allowable temperature at the quick acceleration mode is higher than that at the slow acceleration mode under the same outdoor temperature. Since a large amount of torque is spent in acceleration at the quick acceleration mode, the cooling performance is reduced slightly and the acceleration performance is improved by setting the allowable temperature to be high at the quick acceleration mode.

Figure 6:
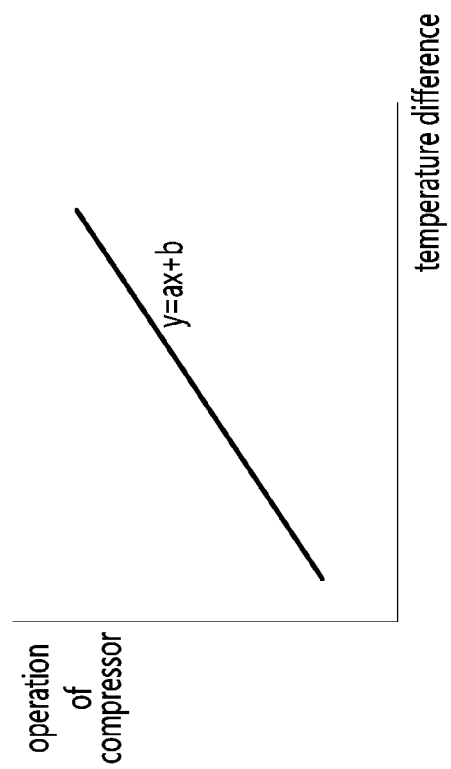
FIG. 6 is a graph showing a relation between an operation of a compressor and a temperature difference.

If the allowable temperature is decided as described above, the control portion 20 determines whether the evaporator temperature is lower than the allowable temperature at a step S130. If the evaporator temperature is higher than or equal to the allowable temperature at the step S130, the control portion 20 proceeds to a step S180 and does not decrease the operation of the compressor. If the evaporator temperature, on the contrary, is lower than the allowable temperature at the step S130, the control portion 20 decreases the operation of the compressor at a step S140. The operation of the compressor, as shown in FIG. 6, is decreased based on a difference between the evaporator temperature and the allowable temperature. That is, the decrease of the operation according to the temperature difference is defined in a map. Herein, it is exemplary shown that the operation amount is proportional to the temperature difference, but the spirit of the present invention is not limited to this.

Figure 7:
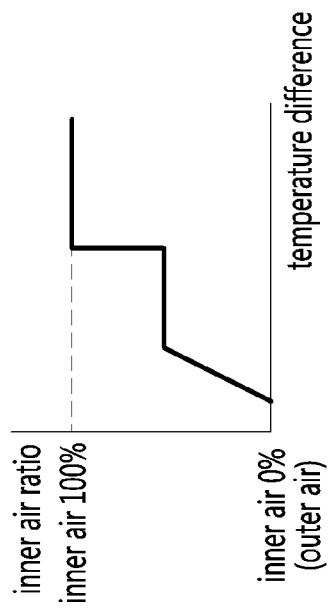
FIG. 7 is a graph showing an inner air ratio according to a temperature difference.
Figure 8:
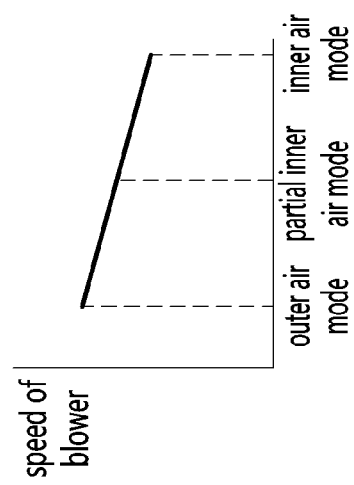
FIG. 8 is a graph showing a blower speed respectively at an outer air mode, a partial inner air mode, and an inner air mode.

After that, the control portion 20 determines whether the evaporator temperature is higher than a target temperature at a step S150. Generally, if the operation of the compressor decreases, the evaporator temperature is raised and the temperature of the air supplied to the cabin is also raised. Thereby, comfort of the cabin may be deteriorated. Therefore, if the evaporator temperature is higher than the target temperature at the step S150, the control portion 20 controls the temperature control door 47, the intake door 48, and the blower 49 so as to suppress a rise of the temperature of the air supplied to the cabin at a step S160. That is, the temperature control door 47 is controlled based on the difference between the temperature of the air supplied to the cabin at the step S110 and the current temperature of the air supplied to the temperature control door 47. The intake door 48, as shown in FIG. 7, is controlled based on a difference between the cabin temperature and the outdoor temperature or the outdoor temperature. A speed of the blower 49, as shown in FIG. 8, is controlled based on an inner air ratio (a ratio of the inner air to the air supplied to the cabin).

Explaining concretely, the temperature control door 47 is controlled to lower the temperature of the air supplied to the cabin. For this purpose, a ratio of the inner air and the outer air is controlled through the intake door 48, and speeds of the inner air and the outer air are controlled through the blower 49.

If the evaporator temperature is lower than the target temperature at the step S150, the control portion 20 does not control the temperature control door 47, the intake door 48, and the blower 49 and proceeds to a step S170.

At the step S170, the control portion 20 determines whether the release condition occurs or the time spent in decreasing the operation of the compressor is larger than or equal to a maximum time. If the release condition does not occur or the time spent in decreasing the operation of the compressor is smaller than the maximum time, the control portion 20 continuously performs the steps S130 to S170, repeatedly.

Meanwhile, if the release condition occurs at the step S170, the control portion 20 proceeds to the step S180 because an operation of the evaporator cannot be decreased. In addition, the time spent in decreasing the operation of the compressor is larger than or equal to the maximum time at the step S170, the control portion 20 decides that the accelerations are continuously performed (e.g., in a case that the vehicle runs uphill), and proceeds to the step S180 for the comfort of the cabin.

Steps S180 to S210 are steps for preparing a normal operation of the compressor 45. If the evaporator temperature is higher than or equal to the allowable temperature at the step S130, the temperature of the air supplied to the cabin is higher than that of the air required for maintaining the comfort of the cabin. In this case, the temperature of the air supplied to the cabin is lowered by raising the operation of the compressor to a target operation of the compressor and the cabin temperature control is performed normally. At this time, if the operation of the compressor is raised quickly, the injection amount of the fuel increases. Therefore, the operation of the compressor is gradually increased so as to prevent the fuel efficiency and the comfort from being deteriorated.

Figure 9:
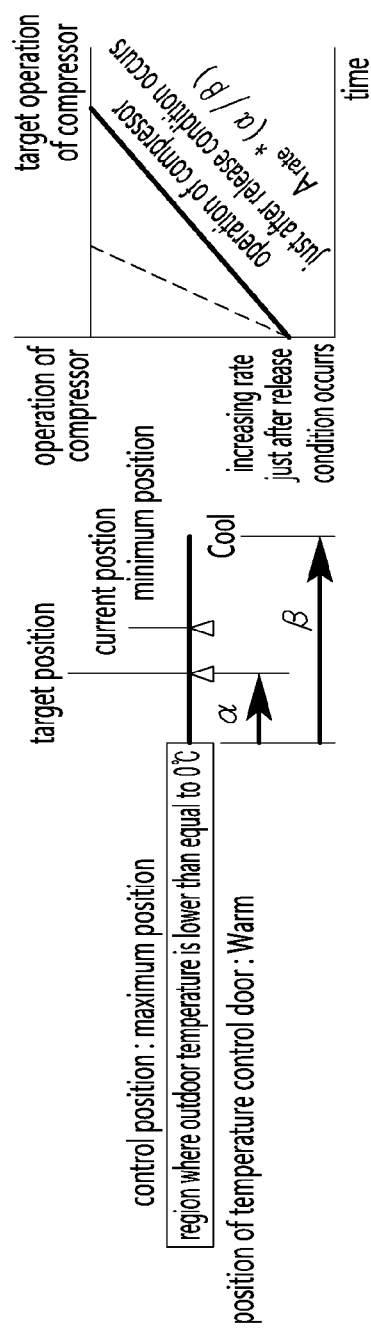
FIG. 9 is a graph showing an operation of a compressor to time.

For this purpose, the control portion 20 increases the operation of the compressor according to a target increasing rate of the operation of the compressor at the step S180. The target increasing rate of the operation of the compressor, as shown in FIG. 9, is calculated according to a target position of the temperature control door 47 and a reference target increasing rate of the operation of the compressor. The target increasing rate of the operation of the compressor $A_{rate}$ is represented as a dotted line in a right graph in FIG. 9. That is, assuming that a distance from a predetermined position of the temperature control door when the outdoor temperature is 0° C. to the target position of the temperature control door is α and a distance from the predetermined position of the temperature control door when the outdoor temperature is 0° C. to a minimum position of the temperature control door is β, the target increasing rate of the operation of the compressor $A_{target}$ is calculated from a following equation.

$$A_{target} = A_{rate} * (\alpha/\beta) \qquad \text{Eq. (a)}$$

The reference target increasing rate of the operation of the compressor $A_{rate}$ represents an increasing rate of the operation of the compressor used for increasing the operation of the compressor at a normal state. Since the operation of the compressor is increased according to the target increasing rate of the operation of the compressor $A_{target}$ that is lower than the reference target increasing rate of the operation of the compressor in various embodiments of the present invention, the operation of the compressor may be prevented from being increased quickly. Therefore, deterioration of the fuel efficiency may be prevented.

After performing the step S180, the control portion 20 determines whether the operation of the compressor is lower than the target operation of the compressor at the step S190. That is, it is determined whether the operation of the compressor reaches the target operation of the compressor. If the operation of the compressor reaches the target operation of the compressor at the step S190, the control portion 20 finishes the method for controlling the compressor according to various embodiments of the present invention and returns to the step S110. If the operation of the compressor is lower than the target operation of the compressor at the step S190, the control portion 20 determines whether the evaporator temperature is higher than the target temperature at the step S200.

If the evaporator temperature is lower than or equal to the target temperature at the step S200, the control portion 20 continuously performs the steps S180 to S200, repeatedly.

If the evaporator temperature is higher than the second target temperature at the step S200, the control portion 20 controls the temperature control door 47, the intake door 48, and the blower 49 so as to suppress the rise of the temperature of the air supplied to the cabin at the step S210. Since the step S210 is the same as the step S160, a detailed description thereof will be omitted.

According to the present invention, an operation of a compressor is decreased when accelerating. Therefore, acceleration performance and fuel efficiency may be improved.

In addition, a temperature control door, an intake door, and a blower are controlled so as to prevent a temperature rise of an air supplied to a cabin according to a decrease of an operation of a compressor. Therefore, comfort may be secured.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for controlling a vehicle compressor, comprising:
   a sensor module including a cabin temperature sensor detecting a cabin temperature of a vehicle, an outdoor temperature sensor detecting an outdoor temperature of the vehicle, an evaporator temperature sensor detecting an evaporator temperature, an engine speed sensor detecting rotation speed of an engine, and a throttle position sensor detecting a throttle opening;
   an air conditioning system including a condenser condensing and liquefying a cooling medium, an evaporator evaporating the liquefied cooling medium, the compressor compressing the cooling medium, a temperature control door controlling a temperature of air flowed in a cabin of the vehicle, an intake door selectively distributing inner air or outer air into the cabin of the vehicle, and a blower blowing the inner air or the outer air to the intake door; and
   a controller controlling an operation of the air conditioning system;
   wherein the controller decides a plurality of acceleration modes and a temperature at each acceleration mode when an acceleration condition occurs, and, when the acceleration condition occurs, the controller decreases an operation of the compressor according to a difference between the evaporator temperature and the decided temperature,
   wherein the acceleration condition is a condition in which the rotation speed of the engine increases, and
   wherein the acceleration modes include differently predetermined accelerations in the rotation speed of the engine.

2. The device of claim 1, wherein the decided temperature at the each acceleration mode is decided according to the outdoor temperature of the vehicle.

3. The device of claim 1, wherein the controller controls the temperature control door to lower the temperature of the air flowed in the cabin when the evaporator temperature is higher than a target temperature during decreasing the operation of the compressor.

4. The device of claim 3, wherein control of the temperature control door by the controller comprises control of the intake door through which the inner air or the outer air selectively flows in the cabin and control of blowing speed of the blower.

5. The device of claim 1, wherein the controller increases the operation of the compressor according to a target increasing rate of the operation of the compressor when a release condition occurs during decreasing the operation of the compressor or a time spent decreasing the operation of the compressor is larger than or equal to a maximum time.

6. The device of claim 5, wherein the controller increases the operation of the compressor until the operation of the compressor reaches to a target operation of the compressor.

7. The device of claim 5, wherein the controller controls the temperature control door to lower the temperature of the air flowed in the cabin when the evaporator temperature is higher than a second target temperature during increasing the operation of the compressor.

8. The device of claim 7, wherein the control of the temperature control door by the controller comprises control of the intake door through which the inner air or the outer air selectively flows in the cabin and control of blowing speed of the blower.

* * * * *